(12) United States Patent
Harlow et al.

(10) Patent No.: US 9,916,704 B1
(45) Date of Patent: Mar. 13, 2018

(54) VEHICLE DECAL

(71) Applicant: Ford Global Technologies, LLC, Dearborn, MI (US)

(72) Inventors: Julee Harlow, Ann Arbor, MI (US); Andrew Henry, Ann Arbor, MI (US); Spencer Henry, Ann Arbor, MI (US); Sydney Schaaf, Detroit, MI (US); Emily Obert, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/266,351

(22) Filed: Sep. 15, 2016

(51) Int. Cl.
| G07C 5/08 | (2006.01) |
| G07C 5/00 | (2006.01) |
| G01S 19/01 | (2010.01) |
| H04L 12/40 | (2006.01) |

(52) U.S. Cl.
CPC ........... G07C 5/0825 (2013.01); G01S 19/01 (2013.01); G07C 5/008 (2013.01); H04L 12/40 (2013.01); *H04L 2012/40215* (2013.01); *H04L 2012/40273* (2013.01)

(58) Field of Classification Search
CPC ....... G07C 5/0825; G07C 5/008; G01S 19/01; H04L 2012/40273; H04L 2012/40215; H04L 12/40
See application file for complete search history.

(56) References Cited

U.S. PATENT DOCUMENTS

| 7,048,400 | B2 * | 5/2006 | Murasko | G09F 13/22 313/506 |
| 8,502,654 | B2 | 8/2013 | Gee et al. | |
| 8,749,368 | B2 | 6/2014 | Pock et al. | |
| 8,970,360 | B2 | 3/2015 | Fujiki et al. | |
| 2005/0028415 | A1 * | 2/2005 | Rodriguez | G09F 21/04 40/597 |
| 2007/0291473 | A1 * | 12/2007 | Traynor | A01K 11/00 362/106 |
| 2012/0139922 | A1 | 6/2012 | Heo | |
| 2014/0200793 | A1 * | 7/2014 | Dufford | G01F 9/02 701/103 |
| 2014/0358326 | A1 * | 12/2014 | Phelan | G06Q 40/00 701/1 |
| 2016/0110935 | A1 | 4/2016 | Kwak | |

FOREIGN PATENT DOCUMENTS

DE 102011122182 A1 6/2012

* cited by examiner

*Primary Examiner* — Rodney A Butler
(74) *Attorney, Agent, or Firm* — Jason Rogers; Price Heneveld LLP

(57) ABSTRACT

A vehicle having a decal attached thereto is provided herein. The vehicle includes a controller operably coupled with a powertrain of the vehicle and configured to calculate an energy efficiency performance score of the vehicle. A decal is disposed on the vehicle. One or more performance score indicators are disposed within the decal. A number of the one or more performance score indicators illuminate to represent the performance score.

17 Claims, 9 Drawing Sheets

VEHICLE DECAL

FIELD OF THE INVENTION

The present disclosure generally relates to vehicle lighting systems, and more particularly, to vehicle lighting systems disposed on a vehicle.

BACKGROUND OF THE INVENTION

Exterior illumination of vehicles can offer a unique and attractive viewing experience. It is therefore desired to implement such structures in automotive vehicles for various lighting applications.

SUMMARY OF THE INVENTION

According to one aspect of the present disclosure, a vehicle includes a controller operably coupled with a powertrain of the vehicle and is configured to calculate an energy efficiency performance score of the vehicle. A decal is disposed on the vehicle. One or more performance score indicators are disposed within the decal. A number of the one or more performance score indicators illuminate to represent the performance score.

According to another aspect of the present disclosure, a vehicle includes a controller operably coupled with a powertrain of the vehicle and is configured to calculate a performance score of a vehicle metric. One or more performance score indicators are disposed within a decal. A number of the one or more performance score indicators dynamically illuminate to represent the performance score.

According to yet another aspect of the present disclosure, a decal for a vehicle is disclosed. One or more performance score indicators are operatively coupled with a conductive lead. A controller is configured to calculate and rank a vehicle metric performance score. The performance score is indicated by a number of performance score indicators that illuminated by the controller.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
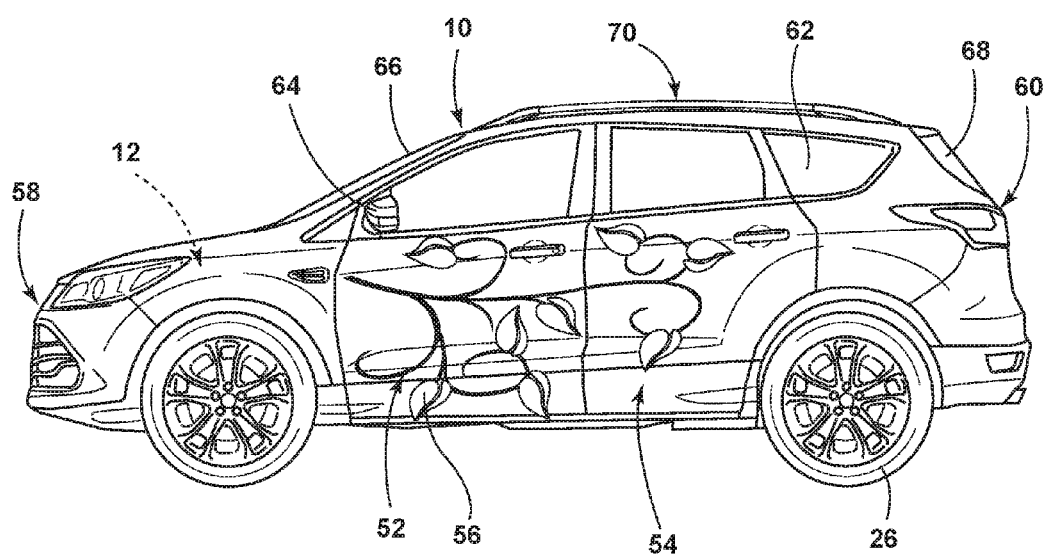
FIG. 2 is a side perspective view of a vehicle having the decal attached thereto.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting assembly for a vehicle. The lighting assembly includes one or more performance score indicators that illuminate to correlate with a calculated performance score of the vehicle operator. The performance score may be based on a plurality of vehicle metrics, including, but not limited to, energy efficiency, performance, and/or safe operation of the vehicle.

Figure 1:
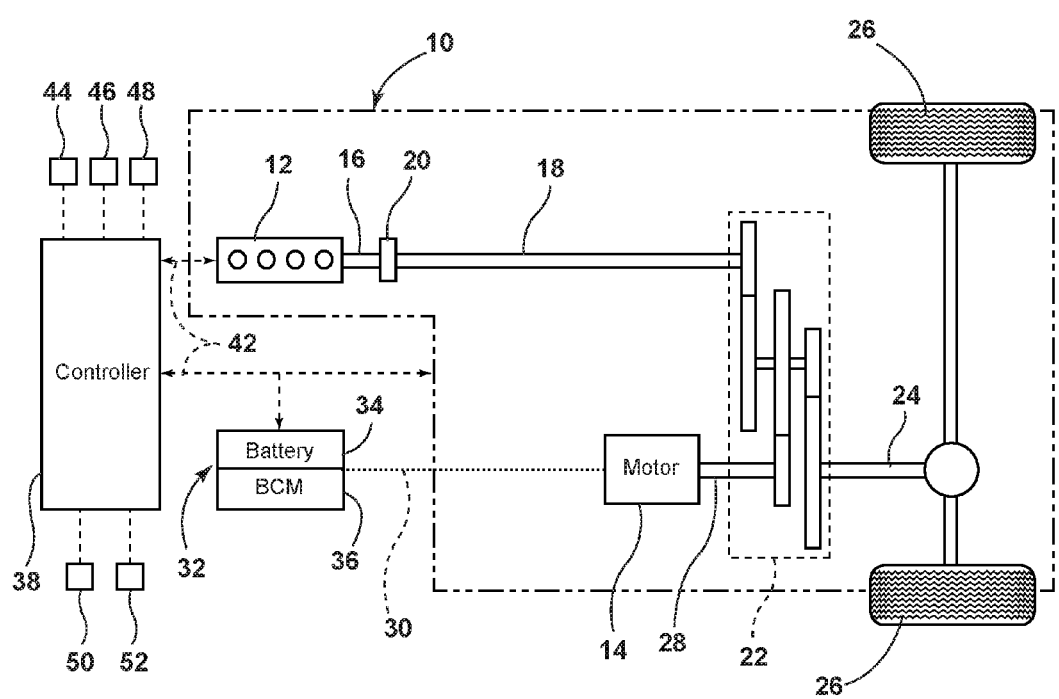
FIG. 1 is a schematic representation of a vehicle including a decal according to one embodiment.

FIG. 1 shows a schematic representation of a vehicle 10, which includes an engine 12 and an electric machine, or a motor 14. The engine 12 outputs torque to a crankshaft 16, which is connected to a shaft 18 through a passive clutch 20. The clutch 20 provides protection against over-torque conditions. The shaft 18 is connected to a gear set 22 that is coupled to a second shaft 24, which is configured to output a torque on a first set of vehicle wheels, or primary drive wheels 26.

The motor 14 is connected to the gear set 22 through a shaft 28. Other vehicles within the scope of the one or more embodiments of the present disclosure may have different electric machine arrangements, such as more than one electric machine. In the embodiment shown in FIG. 1, the motor 14 can also be used as a generator, outputting electrical power to a high voltage bus 30 and to an energy storage system 32, which includes a battery 34 and a battery control module (BCM) 36. Alternatively, and/or additionally, the electric machine arrangement (i.e. the motor 14) can be used as a motor to output torque.

The battery 34 is capable of outputting electrical power to operate the motor 14 and/or any electrical component of the vehicle 10. The BCM 36 acts as a controller for the battery 34. Other types of energy storage systems can be used with the vehicle 10. For example, a device such as a capacitor can be used, which, like the battery, is capable of both storing and outputting electrical energy. Alternatively, a device such as a fuel cell may be used in conjunction with a battery and/or capacitor to provide electrical power for the vehicle 10.

As shown in FIG. 1, the engine 12, the crankshaft 16, the clutch 20, the shaft 18, the gear set 22, the motor 14, a driveline, and any other components may be referred to as a powertrain 40 of the vehicle 10. Any additional components may be disposed within the powertrain 40 without departing from the scope of the present disclosure. To control the engine 12 and components of the powertrain 40, a vehicle control system, shown generally as controller 38, is provided. Although it is shown as a single controller, the controller 38 may include multiple controllers, which may be used to control multiple vehicle systems. For example, the controller 38 may be a vehicle system controller/powertrain control module (VSC/PCM).

A controller area network (CAN) 42 allows the controller 38 to communicate with the powertrain 40 and the BCM 36. Just as the battery 34 includes a BCM 36, other devices may have their own controllers. For example, an engine control unit (ECU) may communicate with the controller 38 and may perform control functions on the engine 12. In addition, the powertrain 40 may include a transmission control module (TCM), configured to coordinate control of specific components within the transmission, such as the motor 14. Some or all of these various controllers can make up a control system of the vehicle 10. Although illustrated and described in the context of the vehicle 10, it is understood that embodiments of the present application may be implemented on other types of vehicles, such as those powered by hybrid systems, an engine 12 and/or an electronic motor 14 alone.

With further reference to FIG. 1, a schematic representation of a braking system 44, an accelerator pedal 46, and an air conditioning system 48 are illustrated. The braking system 44 may include such things as a brake pedal, position sensors, pressure sensors, or some combination of the two, as well as a mechanical connection to the vehicle wheels 26 to effect friction braking. The braking system 44 may also include a regenerative braking system, wherein braking energy is captured and stored as electrical energy in the battery 34. Similarly, the accelerator pedal 46 may include one or more sensors, which, like the sensors in the braking system 44, communicate with the controller 38.

The air conditioning system 48 also communicates with the controller 38. The on/off status of the air conditioning system can be communicated to the controller 38, and can be based on, for example, the status of a driver actuated switch, or the automatic control of the air conditioning system 48 based on related functions such as window defrost. In addition to the foregoing, the vehicle 10 includes an information display system 50, which provides fuel efficiency information to the driver of the vehicle 10. As will be described in greater detail below, the vehicle 10 further includes a decal 52 on the vehicle 10 that dynamically illuminates to notify the operator of the vehicle 10 of a performance score of a desired vehicle metric. For purposes of the present disclosure, the term "dynamically illuminates" is defined as illumination that may change at discrete or continuous times during the lifespan of the vehicle 10. The decal may be configured as any type of assembly that may be adhered to a structure of the vehicle 10. According to one embodiment, the decal 52 may be adhered to an external surface of the vehicle structure and may confer a graphic in the illuminated and/or unilluminated state. Additionally, and/or alternatively, the graphic on the decal 52 may be formed from an ink and the graphic may be generally visible in the unilluminated state, or only visible when backlit by a light source 120.

The "performance score" is defined as a numerical indicator of a driver's driving performance in regard to a predefined vehicle metric relative to an empirically-best driving performance vehicle metric achieved previously by the driver or by a similar vehicle having common features, such as engine size, transmission design, etc.

Referring to FIG. 2, according to one embodiment, an exterior of the vehicle 10 is generally shown according to one embodiment. As shown, the decal 52 is arranged over a side portion 54 of the vehicle 10 and includes one or more performance score indicators 56. For example, the decal 52 is exemplarily patterned as a plant having a plurality of leaves, wherein the leaves are configured as the performance score indicators 56 that illuminate in response to achieving predefined levels of calculated scores and/or having a performance score in a specific range when compared to comparable vehicles in a similar region. It should be appreciated that the decal location is not limited to that depicted in FIG. 2, and may include other locations on the side portion 54, a front portion 58, and a rear portion 60 of the vehicle 10 on the interior or exterior of the vehicle 10. It is also contemplated that the decal 52 may be arranged over a portion of a window 62, side mirror assembly 64, front windshield 66, rear windshield 68, and roof structure 70 of the vehicle 10. Furthermore, it is contemplated that the decal 52 may be arranged in other sizes, shapes, and/or patterns, and may be applied to linear and/or non-linear surfaces of the vehicle 10.

According to one embodiment, the performance score indicators 56 illuminate in response to a calculated metric of a vehicle-related condition, which may be an overall energy efficiency of the vehicle 10. In such embodiments, the performance score indicators 56 may illuminate to represent efficient operation of the vehicle 10. In other words, if an operator of the vehicle 10 operates the vehicle 10 in an energy efficient manner, a high energy efficiency performance score may be achieved and a majority, or all, of the performance score indicators 56 may illuminate. In circumstances in which the operator of the vehicle 10 operates the vehicle 10 in a non-efficient manner, a low energy efficiency performance score may be achieved and a minority (i.e., less than half), or none, of the performance score indicators 56 may illuminate.

The overall energy efficiency may be defined as dollars saved, fuel saved, energy saved, harmful emissions, or the like that are generated through varied usage of the powertrain 40 (FIG. 1). These values may be compared to pre-defined values, values generated by a single vehicle over time, and/or through a comparison to other vehicles that are operated under similar circumstances. By providing energy efficiency information to the driver, the information display 50 and/or the decal 52 may be used by the driver to modify operation of the vehicle 10 in order to increase the overall energy efficiency of the vehicle 10. The overall energy efficiency may be shown to proximately driven vehicles such that the operator of the vehicle 10 may compete or broadcast their ability to operate the vehicle 10 in an efficient manner.

The decal 52 may also be operably coupled with the controller 38 described in FIG. 1, or any other controller disposed within the vehicle 10. The controller 38 may be configured to receive sensed inputs that relate to current operating conditions of the vehicle 10, to analyze the sensed inputs, to calculate a performance score, and/or to provide outputs to the decal 52 such that the decal 52 indicates the obtained performance score.

Figure 3:
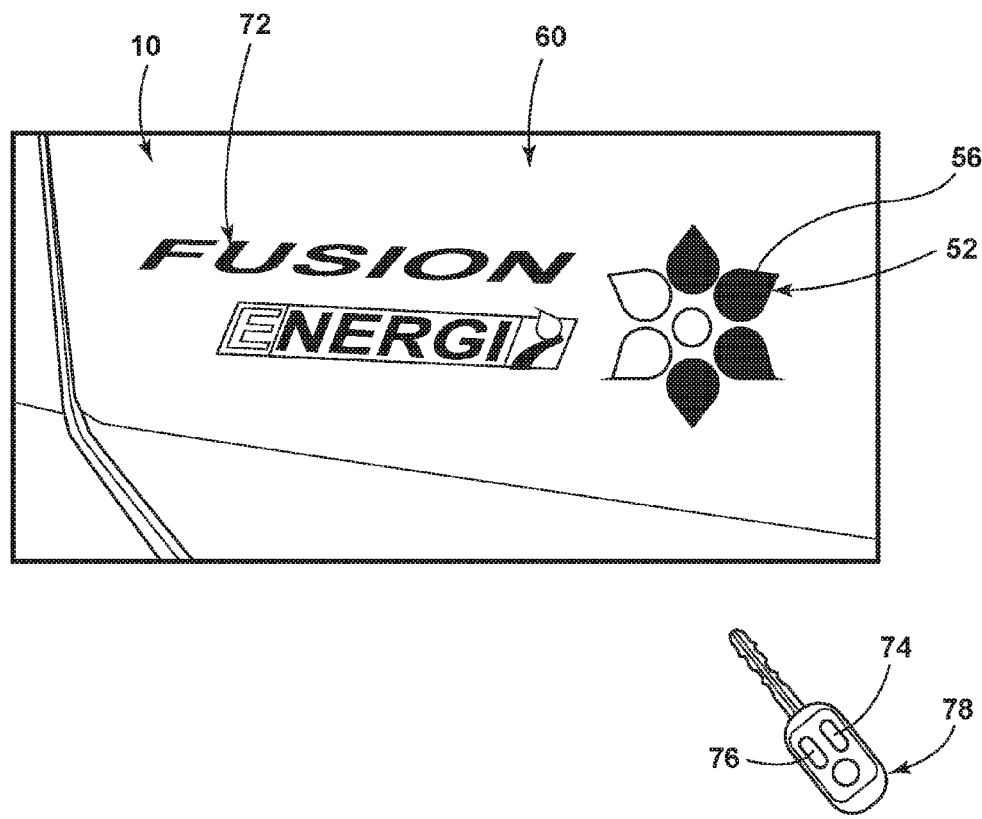
FIG. 3 is a partial rear perspective view of the vehicle and the decal having a plurality of performance score indicators incorporated in a badge.

Referring to FIG. 3, the decal 52 may be disposed on the rear portion 60 of the vehicle 10. The decal 52 may be incorporated with, or integrally disposed within, a badge 72 disposed on the vehicle 10. In other embodiments, the badge 72 may be located elsewhere, such as, but not limited to, the front portion 58 and/or the side portion 54 of the vehicle 10. Alternatively, the badge 72 may be disposed inside the vehicle 10. The badge 72 may be configured as an insignia that is presented as an identifying mark of a vehicle manufacturer.

The decal 52 may be activated in response to a user activating a door unlock 74, or a door lock 76, switch on a key fob 78 when the user is within signal communication range of the vehicle 10. Upon activation of the door unlock 74 switch or button, the decal 52, and thus, the performance score indicators 56, illuminate to indicate a calculated performance score of the vehicle 10. The decal 52 may remain on for a predetermined time period, such as two minutes, and may be turned off prior to the predetermined time period when the vehicle lock 76 switch is activated. Moreover, the decal 52 may be illuminated when the engine 12 is in an ON state, when the vehicle running lights are illuminated, when the vehicle headlights are illuminated, etc.

Figure 4:
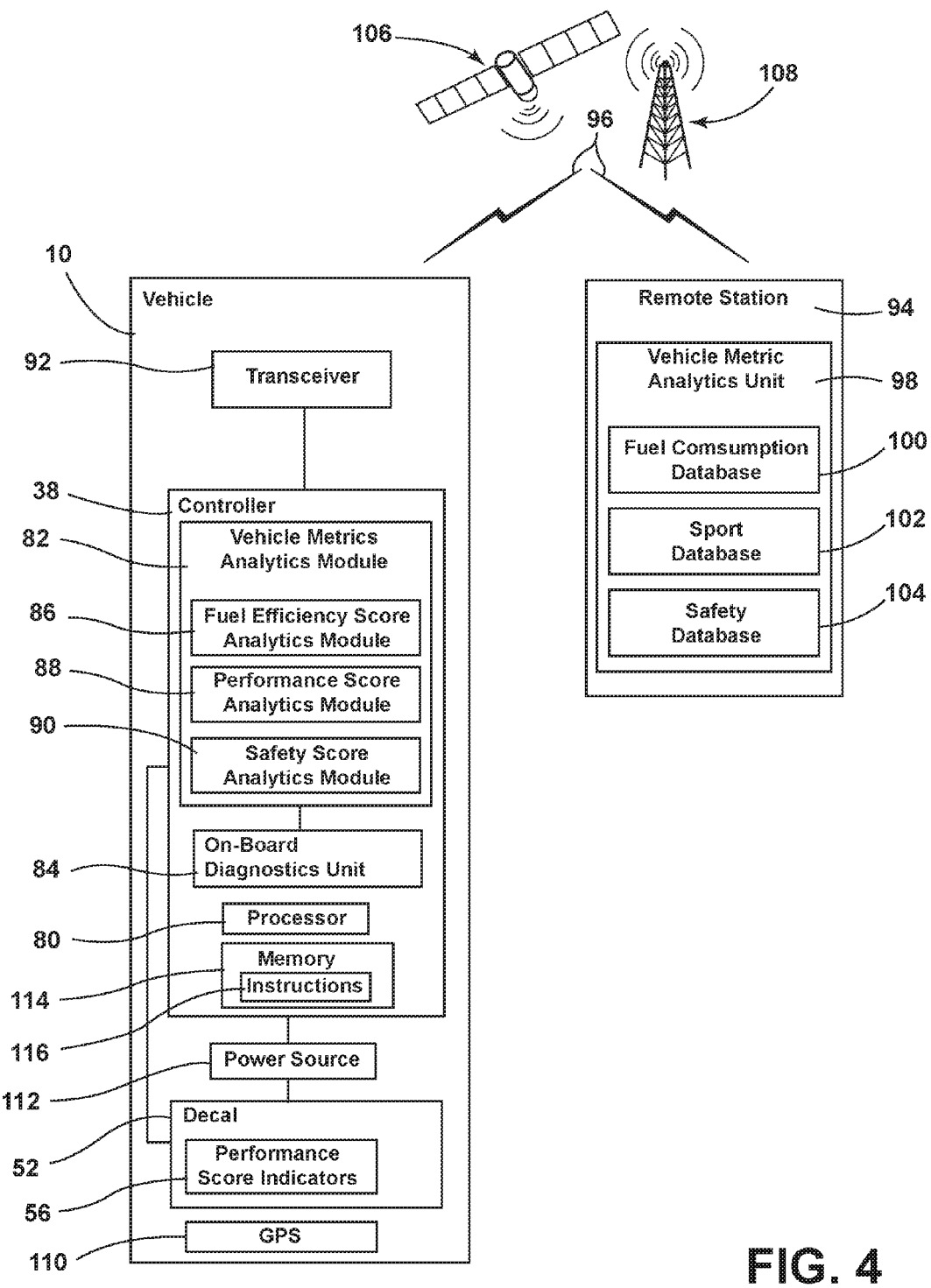
FIG. 4 is a block diagram illustrating a performance score system in communication with a remote station having various vehicle metric databases, according to one embodiment.

Referring to FIG. 4, the performance score may be calculated by a processor 80 within the controller 38, which includes a vehicle metrics analytics module 82 and a vehicle on-board diagnostics (OBD) unit 84. The vehicle metrics analytics module 82 may include a fuel efficiency analytics module 86, a sport performance score analytics module 88, and/or a safety performance score analytics module 90.

The vehicle OBD unit 84 is installed inside the vehicle 10. The vehicle OBD unit 84 may also be connected to the controller 38, the ECU, and/or other vehicular control chipsets to record, diagnose, and generate a variety of engine 12 vehicle dynamics and fuel consumption data as a real-time data stream. This real-time data stream from the vehicle OBD unit 84 can be transmitted inside the vehicle 10 to the vehicle metrics analytics module 82, which in turn analyzes the real-time data stream to calculate one or more metrics, such as a driver's current fuel efficiency driving performance and/or the driver's performance score.

The vehicle 10 may further include one or more of the wireless communication transceivers 92 that is configured to interact with a remote station 94 through a data communication network 96. The data communication network 96 may include at least one of a cellular communication network, a satellite communication network 106, a land-mobile radio communication network 108, an internet based network that is intermittently used to transfer data, or a combination thereof. The remote station 94 includes a vehicle metric analytics unit 98. Furthermore, the vehicle metric analytics unit 98 includes a fuel consumption database 100, a sport database 102, and a safety database 104.

In order to calculate the performance score for the vehicle 10, the remote station 94 may store and access a vehicle metric driving performance dataset from multiple vehicles, so that the empirically-best vehicle metric driving performance achieved can be tracked and utilized for accurate calculation of the driving performance score. The updated vehicle metric driving performance dataset for the multiple vehicles is stored, updated, and categorized by vehicle models and makes in the fuel consumption database 100, the sport database 102, and/or the safety database 104, which is typically operated and executed by a computer server located in the remote station 94. Furthermore, the fuel consumption database 100 may also store, update, and categorize the updated fuel efficiency driving performance dataset by driving routes and traffic conditions. In some embodiments, to compensate for variances in vehicle features, each vehicle's driving performance scores may be normalized such that non-similar vehicles may be compared to one another.

With further reference to FIG. 4, the vehicle metrics analytics module 82 can store data streams from the OBD unit 84 and any information retrieved from the remote station 94. Furthermore, the fuel efficiency analytics module 86 of the vehicle metrics analytics module 82 can retrieve the data streams and the fuel consumption information from the fuel consumption database 100 to calculate a real-time driving score for a driver of the vehicle 10.

Furthermore, in one embodiment, a global positioning system (GPS) receiver 110 in the vehicle 10 may be utilized to record and synchronize GPS location information with the data streams for combining the real-time route and/or traffic condition information of the vehicle 10 with the real-time information associated with the vehicle 10.

With further reference to FIG. 4, the controller 38 is electrically connected to the decal 52 and to the power source 112, which may correspond to a vehicular power source. The controller 38 may be variously located within the vehicle 10 and includes a processor 80 in communication with a memory 114. The memory 114 includes instructions 116 stored thereon that are executable by the processor 80. The instructions 116 relate to controlling an activation state of the performance score indicators 56 and enable the controller 38 to selectively activate the performance score indicators 56. The controller 38 may use signals received from vehicle metrics analytics module 82 and the OBD unit 84 to control the activation state of the performance score indicators 56.

Moreover, the controller 38 may vary the illumination of the decal 52, and more specifically, the performance score indicators 56, based on an operational state of the vehicle 10, a status related to a particular vehicle component (e.g., an open door), a key fob 78 proximity status, a remote signal sourced from a portable electronic device, a status related to an operating environment of the vehicle 10 (e.g., an ambient light level), or any other information or control signal that may be utilized to activate or otherwise adjust the output of the performance score indicators 56. It should be appreciated that the controller 38 may be connected to additional decals and configured to selectively activate each decal 52 based on one or more vehicle-related conditions and/or vehicle metrics.

Figure 5:
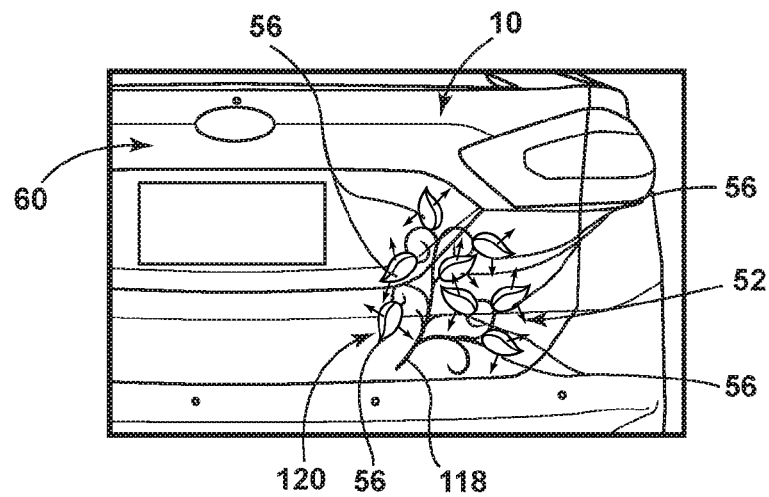
FIG. 5 is a rear partial perspective view of the vehicle having a majority of performance score indicators illuminated, according to one embodiment.
Figure 6:
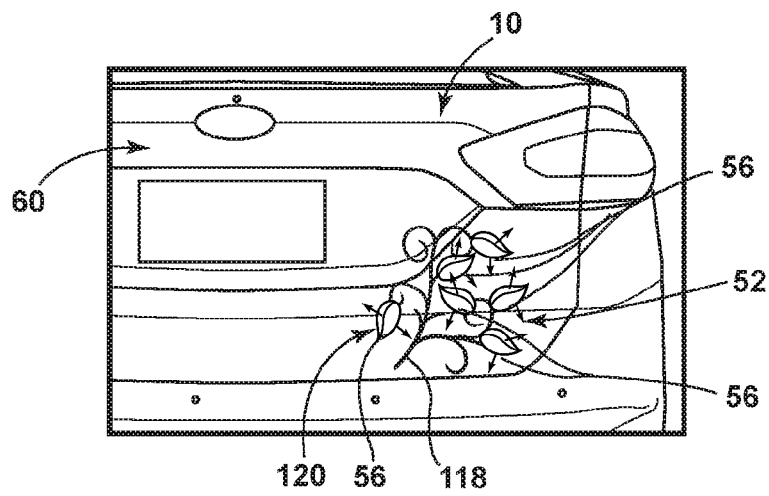
FIG. 6 is a rear partial perspective view of the vehicle having six performance score indicators illuminated, according to one aspect.
Figure 7:
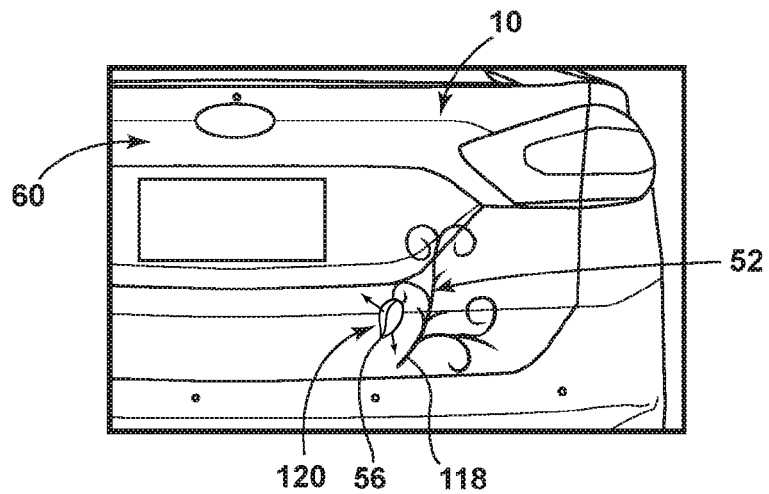
FIG. 7 is a rear partial perspective view of the vehicle having a single performance score indicator illuminated, according to one embodiment.

Referring to FIGS. 5-7, various illustrations of the decal 52 having performance score indicators 56 illuminated are exemplary illustrated on a rear portion 60 of the vehicle 10. The performance score may be based on a comparison to other vehicles driving similar routes, as discussed above. As also discussed above, the performance score may be normalized to account for variations in vehicle features.

According to one embodiment, the performance score may be calculated based on the vehicle's performance score in comparison to the overall data set of vehicles operating in a similar manner. The decal 52 may continually illuminate a corresponding number of performance score indicators 56 for a predetermined time. For example, according to one embodiment, the decal 52 may illuminate a constant number of performance score indicators 56 during a period of time between refueling of the vehicle 10. Additionally, and/or alternatively, the decal 52 may maintain an illumination state for one trip. A trip may be defined as the time between the vehicle 10 being placed in an engine ON state and the vehicle 10 being subsequently placed in an engine OFF state.

According to one embodiment, the performance score is updated each time the vehicle engine 12 returns to the engine OFF state and the performance score will be reset each time the vehicle 10 is refueled. In embodiments where the performance score is reset each time the vehicle 10 is refueled, the decal 52 may illuminate to indicate the performance score that was achieved during the previously consumed tank of fuel. After the first vehicle engine OFF condition following a refueling of the vehicle 10, the performance score may be updated to reflect the results from the first trip. However, the score may dynamically update in alternate embodiments, or update at any other desired time and/or frequency. Moreover, the performance score may be reset for any other reason, at any other time, and/or at any frequency without departing from the scope of the present disclosure.

The performance score may be correlated to any number of integers that may be stored in a look-up table (LUT) and correspond to the number of performance score indicators 56 within the decal 52. For example, according to one embodiment, the performance score is correlated to a set of eight integers. Accordingly, a performance score in the top 12.5% of performance scores may correlate to an illumination of eight performance score indicators 56 (FIG. 5). A performance score in the next 12.5% of performance scores may correlate to an illumination of seven performance score indicators 56. A performance score in the top 62.5% may correlate to an illumination of six performance score indicators 56 (FIG. 6), and so on. In the embodiment illustrated in FIGS. 5-7, a single performance score may be illuminated even when the performance score is the worst possible score (FIG. 7). Accordingly, the number of performance score indicators 56 that are illuminated correlates to the performance score obtained and/or the ranking of the performance score when compared to similarly situated vehicles.

With further reference to FIGS. 5-7, the decal 52 may include a first portion 118 that provides conductive leads for each of the performance score indicators 56 that are disposed within the decal 52. The performance score indicators 56 of the decal 52 may include any form of light source 120 that are operably coupled to the conductive leads. For example, the light source 120 may include fluorescent lighting, light emitting diodes (LEDs), organic LEDs (OLEDs), polymer LEDs (PLEDs), solid state lighting, or any other form of lighting configured to emit. In embodiments employing a stem with a plurality of leaves, the first portion 146 may be the stem while the performance score indicators 56 may form the leaves.

Figure 8:
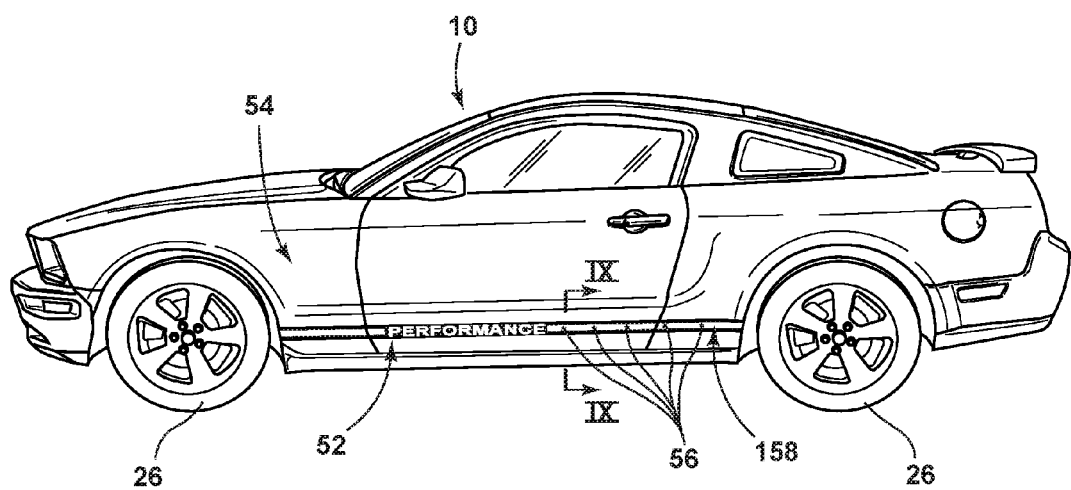
FIG. 8 is a side perspective view of the vehicle having a decal that illuminates sport performance indicators disposed within the decal.

Referring to FIG. 8, the decal 52 may be disposed on an exterior portion of the vehicle 10 and represent a sport performance score 158 in conjunction with, or instead of, a fuel efficiency performance score. The sport performance score 158 may be based on any number of vehicle sport performance metrics. For example, the sport performance score 158 may include track times, acceleration rates, etc. The decal 52 may illuminate in a predetermined pattern based on the sport performance score 158 obtained, as provided herein, and may maintain the illuminated state for any desired length of time.

Figure 9:
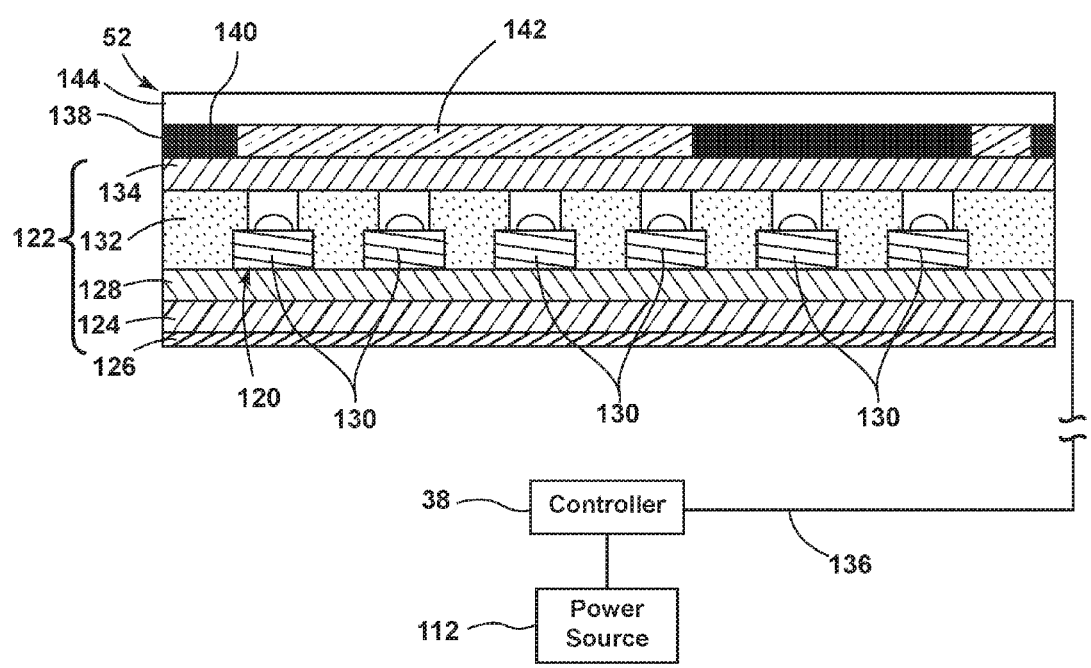
FIG. 9 is a cross-sectional view of the decal along the line IX-IX of FIG. 8 illustrating a light-producing assembly disposed within the decal, according to one embodiment.

Referring to FIG. 9, a cross-sectional view of the decal 52 depicted in FIG. 8 is shown according to one embodiment. As illustrated in FIG. 9, the decal 52 may have a stacked arrangement and includes a light-producing assembly 122 corresponding to a thin-film or printed light emitting diode (LED) assembly. The light-producing assembly 122 includes a substrate 124 arranged over an adhesive layer 126 for affixing the decal 52 to the vehicle 10. The substrate 124 may include a polycarbonate, poly-methyl methacrylate (PMMA), or polyethylene terephthalate (PET) material on the order of 0.005 to 0.060 inches thick. A positive electrode 128 is arranged over the substrate 124 and includes a conductive epoxy such as, but not limited to, a silver-containing or copper-containing epoxy. The positive electrode 128 is electrically connected to at least a portion of a plurality of LED sources 130 arranged within a semiconductor ink 132 and applied over the positive electrode 128. Likewise, a negative electrode 134 is also electrically connected to at least a portion of the LED sources 130. The negative electrode 134 is arranged over the semiconductor ink 132 and includes a transparent or translucent conductive material such as, but not limited to, indium tin oxide. Additionally, each of the positive and negative electrodes 130, 134 are electrically connected to a controller 38 and a power source 112 via one or more wirings 136. The one or more wirings 136 may be wired through the frame of the intended portion of the vehicle 10 (e.g., side portion 54) on which the decal 52 is to be received.

The LED sources 130 may be dispersed in a random or controlled fashion within the semiconductor ink 132 and may be configured to emit focused or non-focused light. The LED sources 130 may correspond to micro-LEDs of gallium nitride elements on the order of 5 to 400 microns in size and the semiconductor ink 132 may include various binders and dielectric material including, but not limited to, one or more of gallium, indium, silicon carbide, phosphorous, and/or translucent polymeric binders. In this manner, the semiconductor ink 132 may contain various concentrations of LED sources 130 such that the density of the LED sources 130 may be adjusted for various lighting applications. The semiconductor ink 132 can be applied through various printing processes, including ink jet and silk screen processes to selected portion(s) of the positive electrode 128. More specifically, it is envisioned that the LED sources 130 are dispersed within the semiconductor ink 132, and shaped and sized such that a substantial quantity of them align with the positive and negative electrodes 130, 134 during deposition of the semiconductor ink 132. The portion of the LED sources 130 that ultimately are electrically connected to the positive and negative electrodes 130, 134 may be illuminated by a combination of the controller 38, power source 112, and the one or more wirings 136.

With continued reference to FIG. 9, a decorative layer 138 is provided on the negative electrode 134 via silk screen, ink jet, or other printing processes. The decorative layer 138 is arranged as a pattern using an opaque ink 140 and a translucent ink 142. A protection layer 144 is optically coupled and adhered to the decorative layer 138 to protect the decal 52 from physical and chemical damage arising from environmental exposure. The protection layer 144 may be arranged using sealing materials that are scratch resistant and provide ultraviolet (UV) shielding.

In operation, the portions of the decorative layer 138 defined by the translucent ink 142 become illuminated by the LED sources whereas the portions of the decorative layer 138 defined by the opaque ink 140 function to outline certain details of the pattern by blocking light outputted by the LED sources. For example, the darkened areas of the decal 52 depicted in FIG. 9 may be defined using opaque ink 140 and the undarkened areas of the decal 52 may be defined using translucent ink 142.

The controller 38 may control the light emission intensity of the light-producing assembly 122 to ultimately affect the brightness in which the decal 52 illuminates. For example, the controller 38 may control the intensity of the LED sources 130 through pulse-width modulation or direct current control. Additionally or alternatively, the controller 38 may control the light emission duration of the LED sources 130 to affect the duration in which the decal 52 illuminates. For example, the controller 38 may activate all or a portion of the LED sources 130 for an extended duration such that at least a portion of the decal 52 exhibits sustained illumination. Alternatively, the controller 38 may flash all or a portion of the LED sources 130 at varying time intervals such that the decal 52 exhibits a blinking effect. In some embodiments, the controller 38 may activate certain portions of the LED sources 130 at different times.

Figure 10:
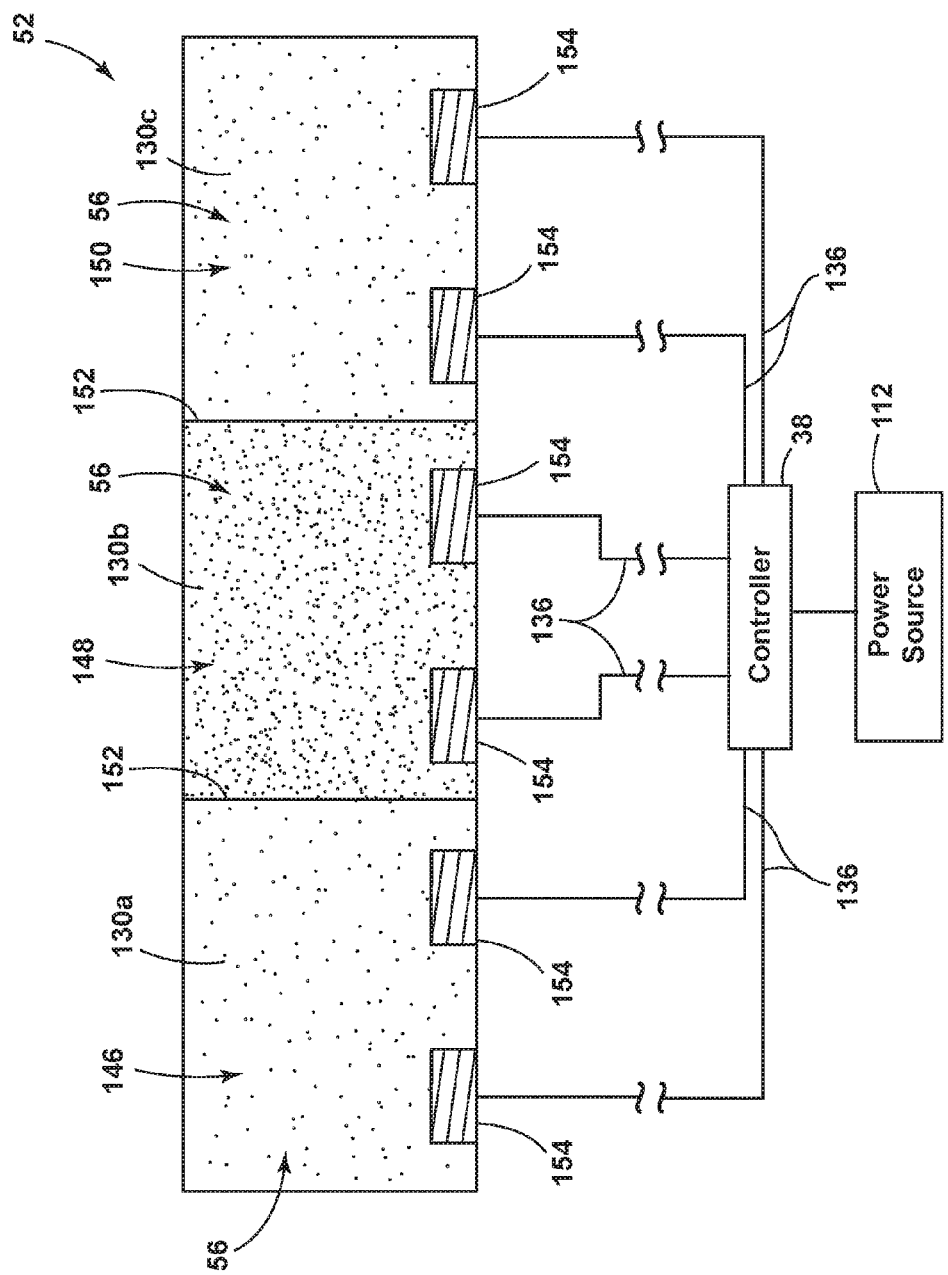
FIG. 10 is a top view of the light-producing assembly shown in FIG. 9.

Referring to FIG. 10, the light-producing assembly 122, according to one embodiment, is illustrated from a top view having varying types and concentrations of LED sources 130a, 130b, 130c transversely along the light-producing assembly 122 thereby forming a plurality of performance score indicators 56. As illustrated, a first portion 146 of the light-producing assembly 122 includes LED sources 130a that are configured to form a first performance score indicator. Likewise, a second portion 148 of the light-producing assembly 122 includes LED sources 130b that are configured to form a second performance score indicator. A third portion 150 of the light-producing assembly 122 includes LED sources 130c that are configured to from a third performance score indicator.

The first, second, and/or third portions 146, 148, 150 of the light-producing assembly 122 may be separated by insulative, or non-conductive, barriers 152 from proximately disposed portions 146, 148, 150 through any means known in the art such that each portion 146, 148, 150 may be illuminated independently of any other portion 146, 148, 150. Further, each portion 146, 148, 150 disposed within the light-producing assembly 122 may include a respective bus bar 154 coupled to the controller 38 and configured to illuminate each respective portion 146, 148, 150. It should be appreciated that the bus bars 154 may be coupled to each portion 146, 148, 150 of the light-producing assembly 122 on opposing sides in alternate embodiments.

The semiconductor ink 132 may also contain various concentrations of LED sources 130a, 130b, 130c such that the density of the LED sources 130a, 130b, 130c, or number of LED sources 130a, 130b, 130c per unit area, may be adjusted for various lighting applications. In some embodiments, the density of LED sources 130a, 130b, 130c may vary across the length of the decal 52. For example, the second portion 148 of the light-producing assembly 122 may have a greater density of LED sources 130 than the first and/or third portions 146, 150. In such embodiments, the light source 120 may appear brighter in order to preferentially illuminate pre-defined locations. In other embodiments, the density of LED sources 130a, 130b, 130c may increase or decrease with increasing distance from a preselected point.

Figure 11:
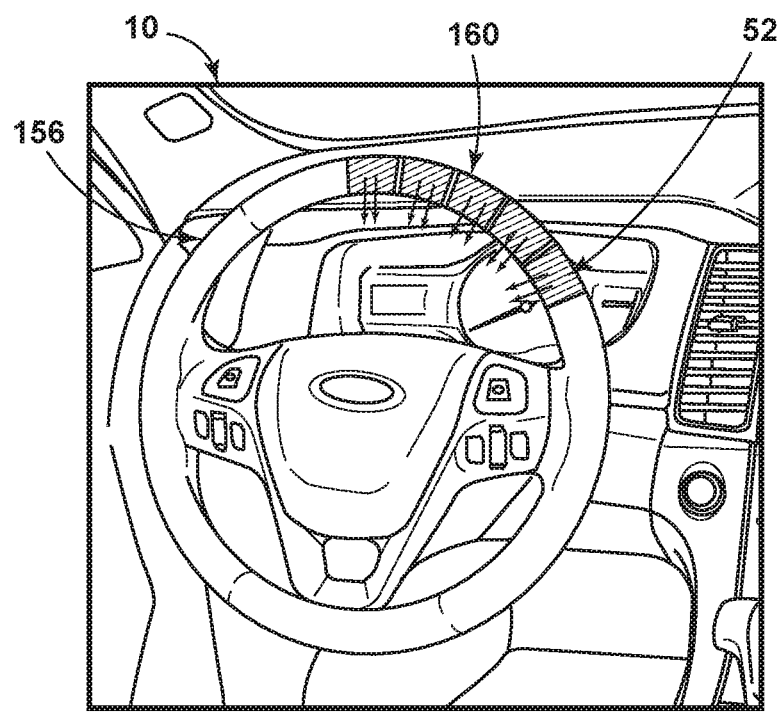
FIG. 11 is a partial perspective view of an interior of the vehicle having the decal disposed on a steering wheel and indicating a safety performance score.

Referring to FIG. 11, the decal 52 may be disposed within the vehicle 10, such as on a steering wheel 156, and illuminate in response to a calculated safety performance score 160. A plurality of metrics may be used for calculating the safety performance score 160. For example, the vehicle 10 may store lane deviations, seat belt usage rates, forward collision warnings, etc. to calculate the safety performance score 160.

A variety of advantages may be derived from the use of the present disclosure. For example, use of the disclosed decal may promote efficient usage of a vehicle 10, and/or promote safe driving habits. Further, the external display of efficient driving may cause other drivers to also operate their vehicles in a similarly efficient manner. Finally, use of the wireless communication transceivers 92 allows for a comparative performance score to other vehicles operating in similar manner to calculate a real time performance score.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited, to physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle comprising:
   a controller operably coupled with a powertrain of the vehicle and configured to calculate an energy efficiency performance score of the vehicle;
   a decal disposed on the vehicle;
   one or more performance score indicators disposed within the decal, wherein a number of the one or more performance score indicators illuminate to represent the energy efficiency performance score; and
   a global positioning system operably coupled with the controller and configured to determine similarly located vehicles to which the energy efficiency performance score is compared.

2. The vehicle of claim 1, further comprising:
   a transceiver configured to communicate with a remote station, wherein the remote station includes a fuel consumption database.

3. The vehicle of claim 2, wherein the vehicle receives data from the fuel consumption database and the energy efficiency performance score of the vehicle is compared to the energy efficiency of similarly located and operated vehicles.

4. The vehicle of claim 1, wherein the decal is disposed on an exterior portion of the vehicle.

5. The vehicle of claim 1, wherein the decal is disposed in close proximity to a badge.

6. A vehicle comprising:
   a controller operably coupled with a powertrain of the vehicle and configured to calculate a performance score of a vehicle metric, wherein the vehicle metric is recalculated each time the vehicle is refueled and an updated vehicle metric is compared to similarly disposed vehicles through a communication network; and
   one or more performance score indicators disposed within a decal, wherein a number of the one or more performance score indicators dynamically illuminate to represent the performance score.

7. The vehicle of claim 6, wherein the one or more performance score indicators are each independently illuminable light-producing assemblies.

8. The vehicle of claim 6, wherein the vehicle metric is a calculation of a fuel efficiency of the vehicle.

9. The vehicle of claim 6, wherein the vehicle metric is a calculation of an acceleration rate.

10. The vehicle of claim 6, wherein the vehicle metric is a calculation of a safety metric.

11. The vehicle of claim 6, wherein the decal includes a stem and the one or more performance indicators are configured as leaves attached to the stem.

12. The vehicle of claim 6, wherein the one or more performance score indicators illuminate in conjunction with one or more exterior lights disposed on the vehicle.

13. A vehicle decal comprising:
    one or more performance score indicators operatively coupled with a conductive lead; and
    a controller configured to calculate and rank a vehicle metric performance score, wherein a corresponding number of the one or more performance score indicators illuminate to represent the calculated rank and the performance score is recalculated each time one trip is concluded and the score from the previous trip is indicated by a number of illuminated performance score indicators.

14. The vehicle decal of claim 13, wherein the one or more performance indicators include independently illuminable light sources.

15. The vehicle decal of claim 13, wherein the one or more performance indicators are illuminated during a welcoming or farewell sequence of the vehicle.

16. The vehicle decal of claim 13, wherein the controller communicates with a remote station and the performance score is compared to other vehicles in a similar location and in similar traffic conditions.

17. The vehicle decal of claim 16, wherein an on-board diagnostics unit monitors a vehicle powertrain to determine a fuel efficiency of the vehicle.

* * * * *

UNITED STATES PATENT AND TRADEMARK OFFICE
CERTIFICATE OF CORRECTION

PATENT NO. : 9,916,704 B1
APPLICATION NO. : 15/266351
DATED : March 13, 2018
INVENTOR(S) : Harlow et al.

Page 1 of 1

It is certified that error appears in the above-identified patent and that said Letters Patent is hereby corrected as shown below:

In the Claims

Column 12, Claim 13, Line 32:
Delete "operatively".

Signed and Sealed this
Third Day of July, 2018

Andrei Iancu
*Director of the United States Patent and Trademark Office*